US010826252B2

(12) United States Patent
Davies et al.

(10) Patent No.: US 10,826,252 B2
(45) Date of Patent: Nov. 3, 2020

(54) METHOD OF MOUNTING AN ELECTRICAL CONNECTOR TO FLEXIBLE PLANAR MATERIAL AND APPARATUS THEREFOR

(71) Applicant: AB Connectors Ltd, Rhondda Cynon Taff (GB)

(72) Inventors: Marcus Davies, Rhondda Cynon Taff (GB); Andrew Gardner, Rhondda Cynon Taff (GB); David Whitworth, Rhondda Cynon Taff (GB)

(73) Assignee: AB Connectors Ltd, Rhondda Cynon Taff (GB)

( * ) Notice: Subject to any disclaimer, the term of this patent is extended or adjusted under 35 U.S.C. 154(b) by 206 days.

(21) Appl. No.: 15/799,604

(22) Filed: Oct. 31, 2017

(65) Prior Publication Data

US 2018/0062329 A1 Mar. 1, 2018

Related U.S. Application Data

(63) Continuation of application No. PCT/GB2016/051261, filed on Apr. 29, 2016.

(30) Foreign Application Priority Data

May 1, 2015 (GB) .................................. 1507591.4
Sep. 15, 2015 (GB) .................................. 1516315.7

(51) Int. Cl.
*H01R 13/73* (2006.01)
*H01R 13/74* (2006.01)
(Continued)

(52) U.S. Cl.
CPC ............. *H01R 13/73* (2013.01); *D05B 23/00* (2013.01); *H01R 13/506* (2013.01); *H01R 13/74* (2013.01);
(Continued)

(58) Field of Classification Search
CPC ... G02B 6/12; G02B 6/26; G02B 6/36; A41D 1/002; D05B 23/00; H01R 12/79;
(Continued)

(56) References Cited

U.S. PATENT DOCUMENTS 4,927,366 A 5/1990 Tommerson et al.
5,325,455 A * 6/1994 Henson ................ G02B 6/3817 385/137
(Continued)

FOREIGN PATENT DOCUMENTS

CN 1076810 A 9/1993
CN 101447623 A 6/2009
(Continued)

OTHER PUBLICATIONS

International Search Report and Written Opinion dated Oct. 20, 2016 on related PCT Application No. PCT/GB2016/051261 filed Apr. 29, 2016.

(Continued)

*Primary Examiner* — Carl J Arbes
(74) *Attorney, Agent, or Firm* — EIP US LLP

(57) ABSTRACT

There is described a method of establishing an electrical connection through a flexible planar material. The method involves attaching an intermediate coupling element to the flexible planar material so as to align an aperture defined by the intermediate coupling element with a hole through the flexible planar material, and coupling an electrical connector to the intermediate coupling element so as to permit electrical connection through the flexible planar material. In this way, the intermediate coupling element can be attached to the garment during the garment manufacture process, and subsequently the electrical connector can be coupled to the intermediate coupling element separately from the main garment manufacture.

9 Claims, 5 Drawing Sheets

(51) Int. Cl.

| | |
|---|---|
| ***H01R 13/506*** | (2006.01) |
| ***D05B 23/00*** | (2006.01) |
| *H01R 13/62* | (2006.01) |
| *H01R 12/79* | (2011.01) |
| *A41D 1/00* | (2018.01) |

(52) U.S. Cl.
CPC .............. *A41D 1/002* (2013.01); *H01R 12/79* (2013.01); *H01R 13/6205* (2013.01)

(58) Field of Classification Search
CPC .. H01R 13/506; H01R 13/6205; H01R 13/73; H01R 13/74
See application file for complete search history.

(56) References Cited

U.S. PATENT DOCUMENTS

| | | | | |
|---|---|---|---|---|
| 6,005,991 | A * | 12/1999 | Knasel | G02B 6/3897 385/114 |
| 6,425,691 | B1 * | 7/2002 | Demangone | G02B 6/3608 385/114 |
| 7,264,405 | B2 * | 9/2007 | Ikeuchi | G02B 6/4201 385/53 |
| 7,583,867 | B2 * | 9/2009 | Terada | G02B 6/4201 385/14 |
| 8,418,269 | B1 | 4/2013 | McBride | |
| 2006/0085890 | A1 | 4/2006 | Beuk | |
| 2007/0026695 | A1 | 2/2007 | Lee et al. | |
| 2008/0312520 | A1 | 12/2008 | Rowlandson et al. | |
| 2010/0100997 | A1 | 4/2010 | Lee et al. | |
| 2014/0187063 | A1 | 7/2014 | Selby et al. | |
| 2014/0213074 | A1 | 7/2014 | Tsang et al. | |

FOREIGN PATENT DOCUMENTS

| | | | |
|---|---|---|---|
| EP | 2757639 | A1 | 7/2014 |
| EP | 3007285 | A1 | 4/2016 |
| KR | 20140005669 | A | 1/2014 |

OTHER PUBLICATIONS

United Kingdom Search Report dated Oct. 9, 2015 on related GB Application No. 1507591.4, filed May 1, 2015.
Office Action dated Dec. 29, 2018 for Chinese Patent Application 201680025176.X.
European Article 94(3) Examination report dated Jan. 27, 2020 for EP Application No. 16726625.3.

* cited by examiner

METHOD OF MOUNTING AN ELECTRICAL CONNECTOR TO FLEXIBLE PLANAR MATERIAL AND APPARATUS THEREFOR

CROSS-REFERENCE TO RELATED APPLICATIONS

This application is a continuation under 35 U.S.C. § 120 of International Application No. PCT/GB2016/051261, filed Apr. 29, 2016, which claims priority to United Kingdom Application No. GB 1507591.4, filed May 1, 2015 and United Kingdom Application No. GB 1516315.7, filed Sep. 15, 2015, under 35 U.S.C. § 119(a). Each of the above-referenced patent applications is incorporated by reference in its entirety.

BACKGROUND OF THE INVENTION

Field of the Invention

The present invention relates to mounting an electrical connector to flexible planar material. The invention has particular, but not exclusive, relevance to mounting an electrical connector to a textile garment.

Description of the Related Technology

There has been increasing interest in "wearable technology" in which electrical components and/or interconnects are incorporated within textiles. For example, electrical components such as keyboards, antennas and sensors have been incorporated in textile material. As another example, a wire loom for providing power to and/or enabling signaling between multiple electrical components has been woven into textile material. The textile electrical components can be part of, or be mounted on, garments. This is particularly advantageous when a person is required to carry many electrical devices, for example a soldier in a technologically advanced army, due to the reduced weight and the reduced risk of cables or wires snagging.

For soldiers, garments are already available having a cavity between two layers of material into which a wire loom can be mounted, for example the Osprey vest. The wire loom may be in the form of a textile electrical component with electrical connectors attached. Such an assembly is often referred to as a spine. It is desired to position at least some of the electrical connectors on the outside of the garment to enable electrical devices, which may or may not be textile electrical components, to connect to the spine. Previously, this has been done by cutting an aperture in the garment at the relevant location, positioning the spine within the cavity inside the garment, and using a conventional retaining mechanism, such as a threaded panel nut, to secure an electrical connector of the spine within the aperture in the garment.

There are disadvantages to using a conventional retaining mechanism, which are primarily designed for use in retaining an electrical connector in an aperture through a rigid panel. In particular, the lack of rigidity of the textile material means that conventional retaining mechanisms for rigid panels are not robust enough to prevent connectors from being pulled through the apertures when subjected to the types of forces that are encountered in normal service.

Various techniques are known in garment manufacture for providing a suitably robust connection of the spine to a textile material, for example using sewing. In practice, however, it is preferred not to send a spine assembly to a garment manufacturer because the spine assembly is expensive and fragile in comparison with other textile materials, so that there is a risk of damage to the spine assembly during the garment manufacturing process.

SUMMARY

The present invention provides a new approach to the problem of mounting an electrical connector to a planar flexible material such as a textile material so as to permit an electrical connection through the planar flexible material.

According to a first aspect of the present invention, there is provided a method of establishing an electrical connection through a flexible planar material. The method comprises attaching an intermediate coupling element to the flexible planar material so as to align an aperture defined by the intermediate coupling element with a hole through the flexible planar material, and coupling an electrical connector to the intermediate coupling element so as to permit electrical connection through the flexible planar material. In this way, the intermediate coupling element can be attached to the garment during the garment manufacture process, and subsequently the electrical connector can be coupled to the intermediate coupling element separately from the main garment manufacture.

The intermediate coupling element can be either directly or indirectly attached to the flexible planar material. For example, the intermediate coupling element can be attached to a support element which in turn is attached to the flexible planar material.

The intermediate coupling element and/or the support element may be sewn to the flexible planar material.

An electrical connector may be connected to the intermediate coupling element via a mechanical coupling mechanism such as a snap-fit mechanism.

The intermediate coupling element may have no electrical function.

According to another aspect of the invention, there is provided apparatus for mounting an electrical connector to a flexible planar material. The apparatus comprising an intermediate coupling element having a frame portion defining an aperture, a flange portion extending around at least part of the aperture to overlap the flexible planar material to facilitate attachment to the flexible planar material; and a coupling mechanism for coupling an electrical connector to the intermediate coupling element when the intermediate coupling element is attached to the flexible planar material to permit electrical connection through the flexible planar material.

According to another aspect of the invention, there is provided a method of fabricating a garment, the method comprising forming a plurality of holes in a flexible planar material for the garment and attaching an intermediate coupling element for each hole, each intermediate coupling element comprising a frame portion defining an aperture, a flange portion that overlaps the flexible planar material surrounding the corresponding hole, and a coupling mechanism for securing a connector within the aperture. A blank connector is removably coupled into each intermediate coupling element via the coupling mechanism, wherein each blank connector, in conjunction with the corresponding intermediate coupling element, closes the corresponding hole. In this way, a garment manufacturer can supply a garment having a selection of mountings, via the intermediate coupling elements, for electrical components. The connector blanks can be maintained in any unselected intermediate coupling elements.

According to a further embodiment of the invention, there is provided a method of attaching an electrical connector to a garment, wherein the garment comprises a plurality of holes with an intermediate coupling element being attached to the material of the garment around each hole and a blank connector being removable coupled within an aperture defined by each intermediate coupling element, the method comprising: removing at least one of the blank connectors; and replacing each removed blank connector with an electrical connector.

Further features and advantages of the invention will become apparent from the following description of various embodiments of the invention, given by way of example only, which is made with reference to the accompanying drawings.

DETAILED DESCRIPTION OF CERTAIN INVENTIVE EMBODIMENTS

Figure 1:
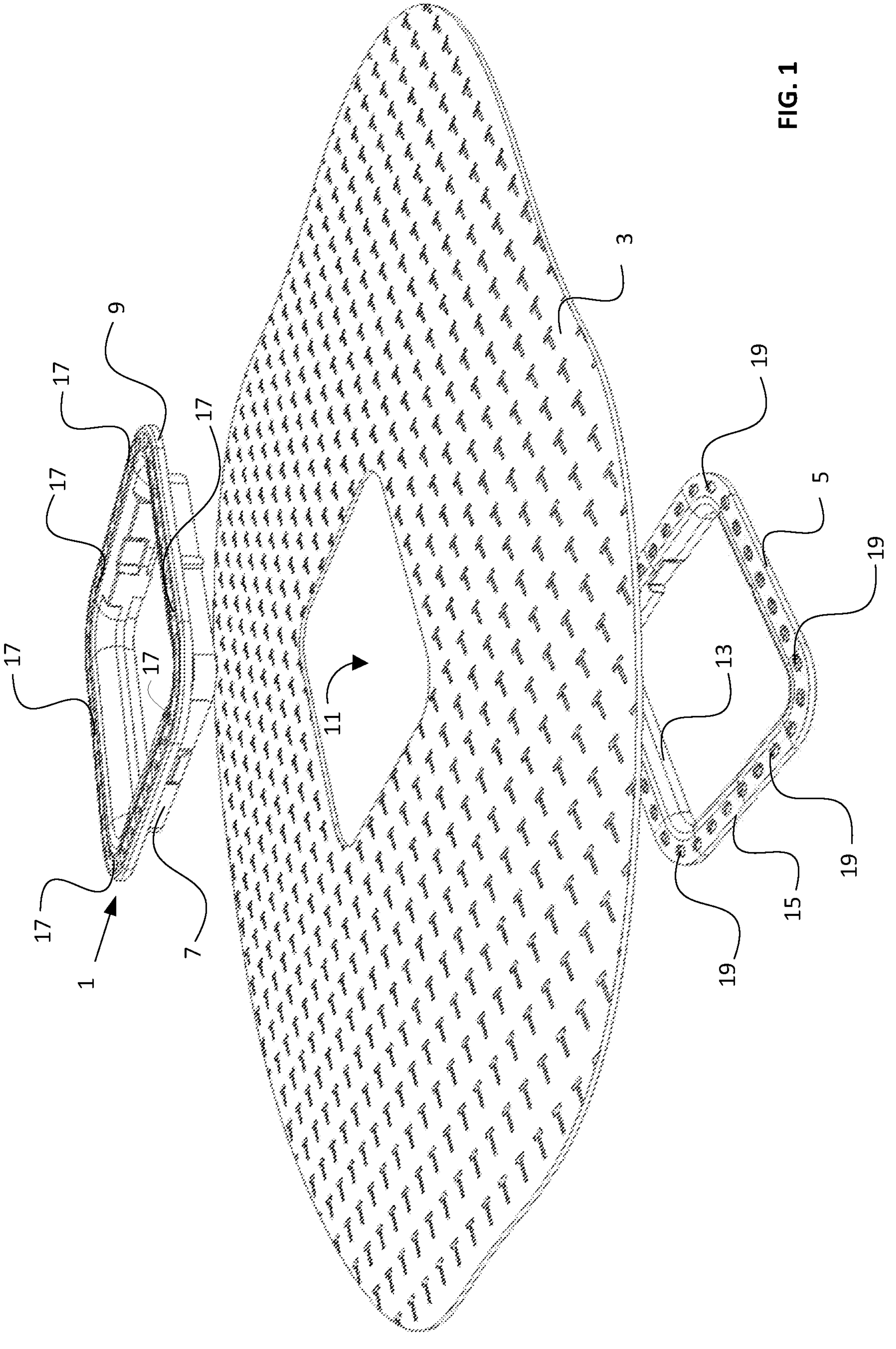
FIG. 1 shows an exploded view of an intermediate coupling element and stiffening element according to an embodiment of the invention either side of a textile material.
Figure 2:
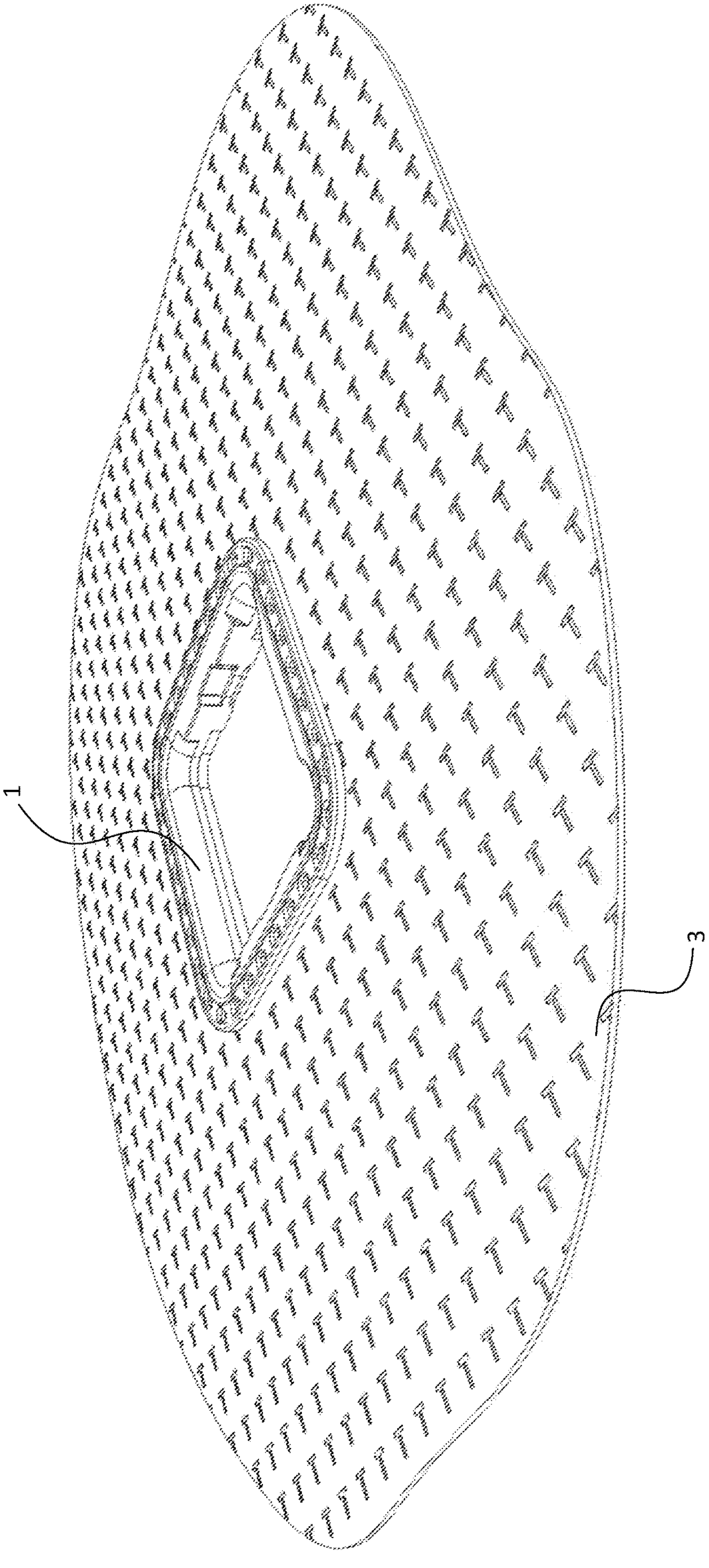
FIG. 2 shows a perspective view of the intermediate coupling element of FIG. 1 attached to the textile material.

As shown in FIGS. 1 and 2, in an embodiment of the invention an intermediate coupling element 1 is attached to a piece of textile material 3. In this embodiment, the intermediate coupling element 1 is made of molded plastic material having some flexibility and is attached to one side of the textile material 3. A support element 5, also made of plastic material, is attached to the other side of the textile material 3 to inhibit flexing movement of the intermediate coupling element 1.

As shown in FIG. 1, the intermediate coupling element 1 is in the form of a hollow frame portion 7 defining an aperture, having a generally rectangular cross-section with rounded corners, with a flange portion 9 extending outwardly from the frame portion 7 at one end of the aperture. The support element 5 is also in the form of a hollow frame portion 13 with a flange portion 15 at one end. The inner diameter of the hollow frame portion 13 of the support element 5 generally matches the outer diameter of the hollow frame portion 7 of the intermediate coupling element 1 so that the hollow frame portion 7 of the intermediate coupling element 1 can slide into the hollow frame portion 13 of the support element 5.

A first series of holes 17 is formed around the flange portion 9 of the intermediate coupling element 1 and a second series of holes 19 is formed around the flange portion 15 of the support element 5. The first and second series of holes 17, 19 are mutually arranged to be in alignment when the hollow frame portion 7 of the intermediate coupling element 1 is inserted in the hollow frame portion 13 of the support element 5.

The intermediate coupling element 1 and the support element 5 have no electrical function, and as such have no electrical component or electrical interconnect mounted thereon. The purpose of the intermediate coupling element 1 and the support element 5 is to provide a mechanical mount to which a device having electrical components or electrical interconnects can be mounted.

The process of attaching the intermediate coupling element 1 to the textile material 3 involves first cutting a hole 11 in the textile material 3 generally corresponding to the cross-section of the hollow tube portion 7, aligning the aperture defined by the intermediate coupling element 1 with the cut hole, and then passing the hollow frame portion 7 of the intermediate coupling element 1 through the hole 11 until the flange portion 9 abuts a first side of the textile material 3. The support member 5 is provided on the opposite side of the textile material to the intermediate coupling element 1. The hollow frame portion 7 of the intermediate coupling element 1 passes through the flange portion 15 of the support element 5 and then through the hollow frame portion 13 of the support element 5, either in the same act as passing through the hole 11 in the textile material 3 or in a separate act, until a peripheral portion of the textile material 3 is gripped between the flange portion 9 of the intermediate coupling element 1 and the flange portion 15 of the support element 5. The intermediate coupling element 1 and the support element 5 are then sewn onto the textile material 3 by passing a needle and thread sequentially through the first and second series of holes 17, 19.

Figure 3:
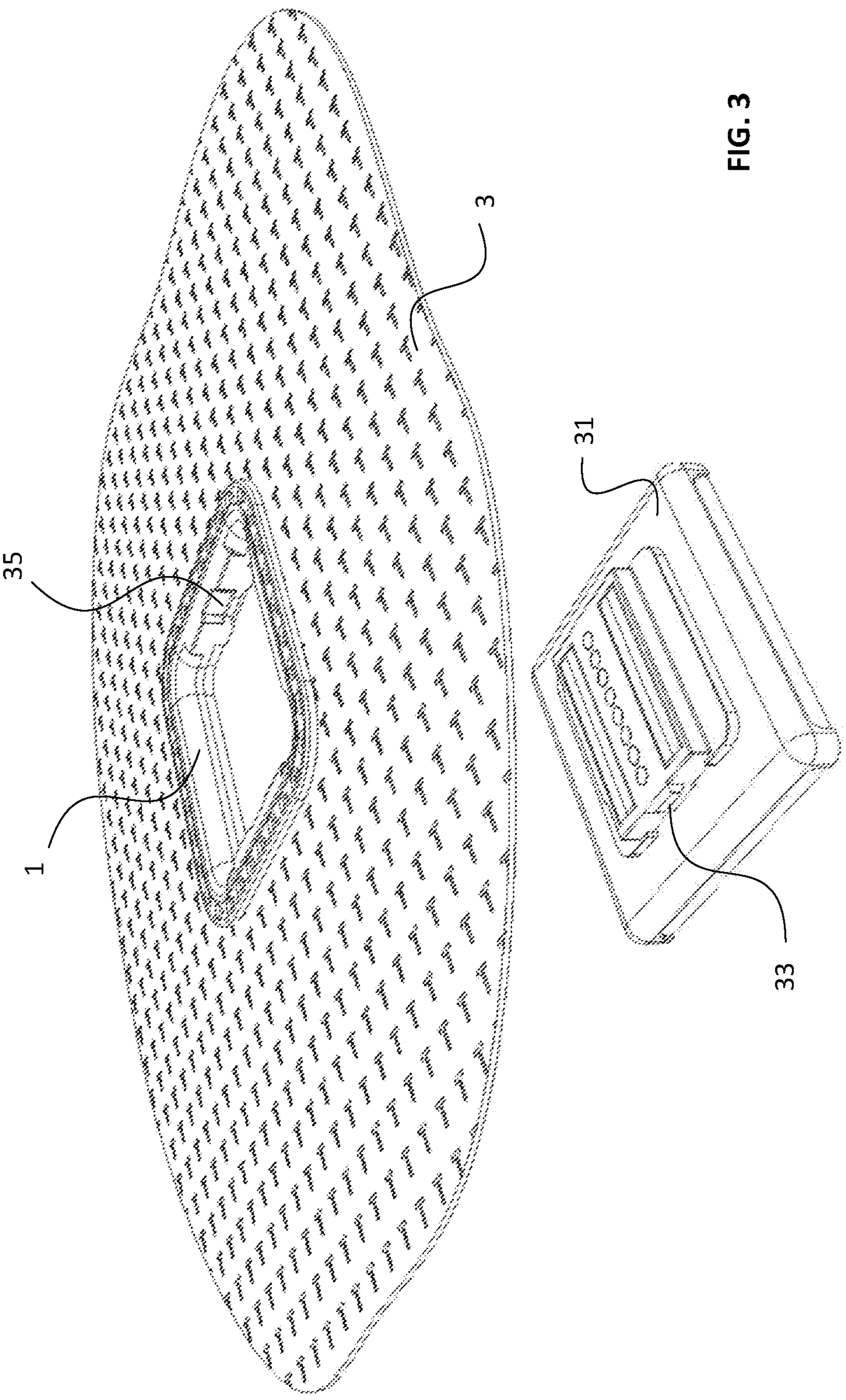
FIG. 3 shows an exploded view of the textile material with the intermediate coupling element and the support element attached and an electrical socket.

In this embodiment, the process of attaching the intermediate coupling element 1 and the support element 5 to the textile material 3 is performed during the manufacture of a garment of which the textile material 3 is part. The intermediate coupling element 1 has a mechanical coupling mechanism for coupling to an associated electrical socket 31, as shown in FIG. 3. The electrical socket 31 provides multiple electrical connections to a panel of "intelligent" textile material (not shown in FIG. 3 for ease of illustration) such as that developed by Intelligent Textiles Ltd. The "intelligent" textile material forms a wiring harness assembly or spine assembly for supplying power and/or data signals. The coupling of the electrical socket 31 to the intermediate coupling element 1 is typically performed at a later date than, and at a different location from, the attachment of the intermediate coupling element 1 and the support element 5 to the textile material 3, and is not performed by the garment manufacturer so that the garment manufacturer does not need to handle the spine assembly.

In this embodiment, the mechanical coupling mechanism for connecting the electrical socket 31 to the intermediate coupling element 1 is a snap-fit assembly. In particular, in this embodiment, the snap fit assembly involves a pair of lugs 33 (only one of which is shown in FIG. 3) on the electrical socket 31 respectively engaging a pair of recesses 35 (only one of which is shown in FIG. 3) in the inner surface of the hollow tube portion 7 of the intermediate coupling element 1.

The mechanical coupling mechanism for connecting the electrical socket 31 to the intermediate coupling element 1 allows for removable coupling of the electrical socket 31 to the intermediate coupling element 1. Such removable coupling allows the electrical socket 31 to be decoupled from the intermediate coupling element 1 during the lifetime of the product, for example providing a convenient mechanism for allowing repair or upgrading of the spine assembly. It will be appreciated that such decoupling may be facilitated by the use of a mechanical tool.

Figure 4A:
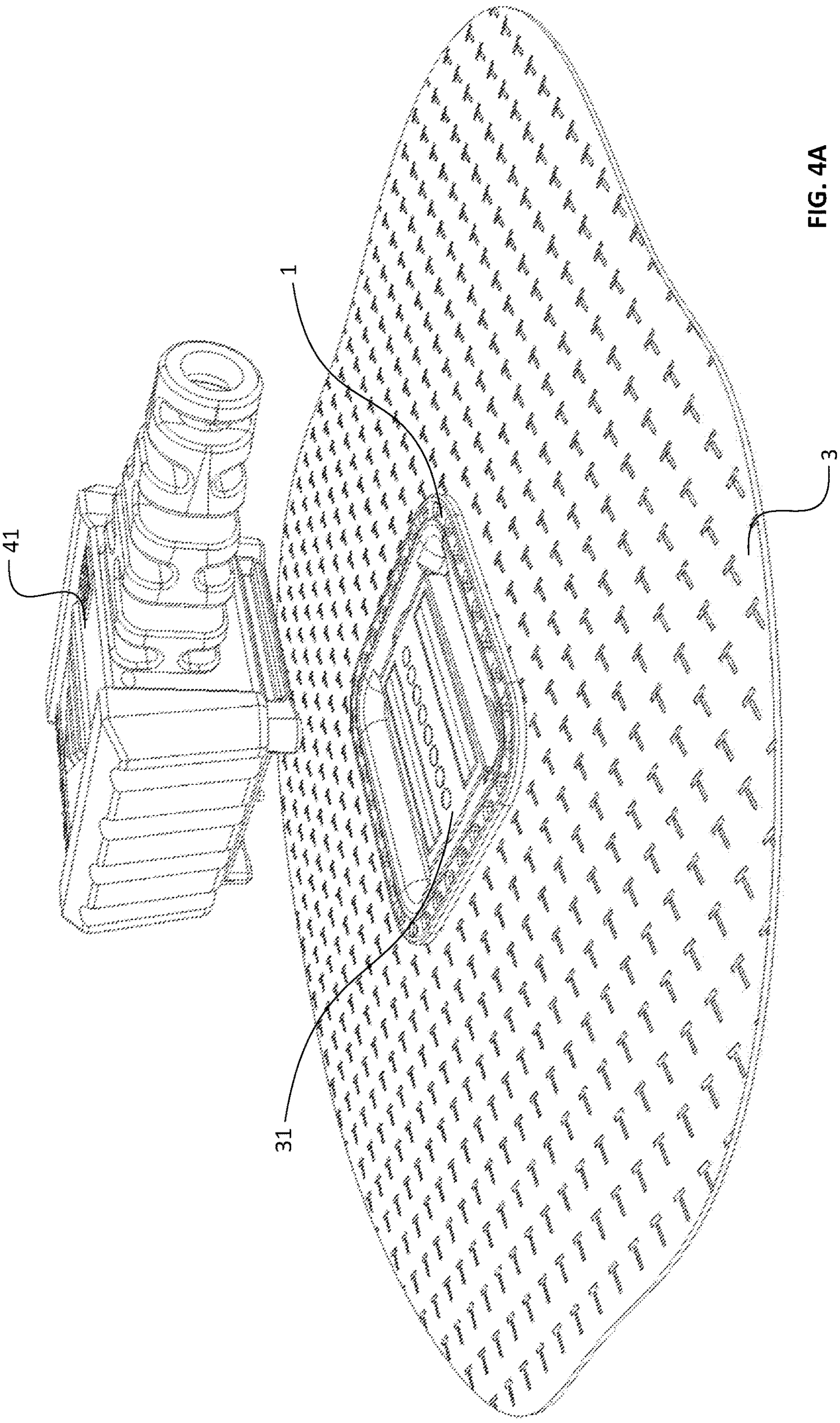
FIGS. 4A and 4B show the electrical socket connected to the textile material via the intermediate coupling element with an electrical plug respectively in a disconnected and a connected state.
Figure 4B:
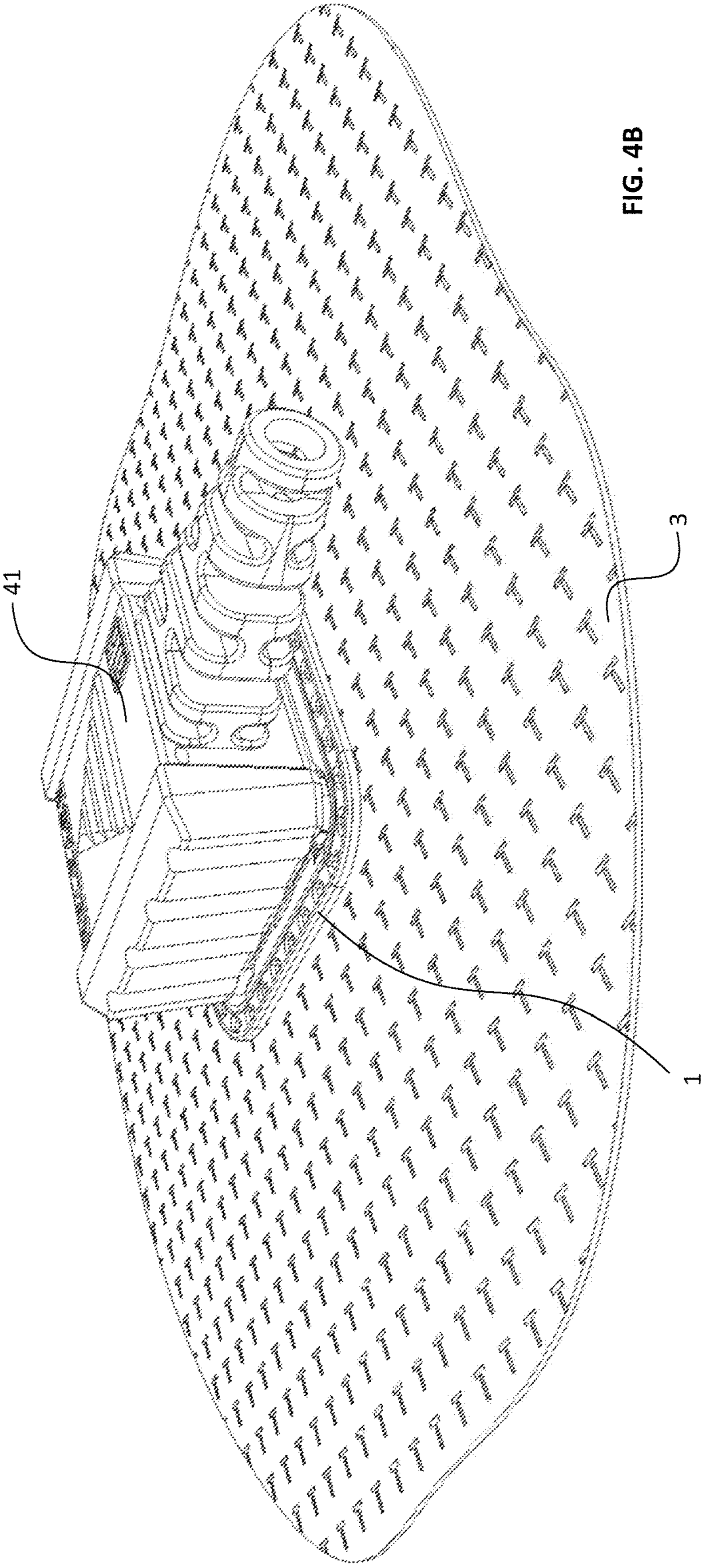

The electrical socket 31 allows the spine assembly to be connected to electrical devices mounted on the garment or in the vicinity of the person wearing the garment, e.g. in a vehicle in which the person is travelling. FIGS. 4A and 4B show an electrical plug 41 and the electrical socket 31 in connected and disconnected states. In this embodiment, the electrical connection assembly formed by the electrical plug 41 and the electrical socket 31 uses the magnetic latching mechanism described in UK patent application no. 1506418.1, the whole contents of which is incorporated herein by reference.

It will be appreciated from FIGS. 3, 4A and 4B that the electrical socket 31 is mounted to one side of the textile material 3 while the electrical plug 41 is mounted to the other side of the textile material 3. As discussed above, in this example the electrical socket 31 is connected to a spine assembly. Accordingly, the arrangement establishes an electrical connection through the textile material 3 to the spine assembly. In example implementations, the textile material 3 forms the outer surface of a garment having one or more cavities formed therein. The spine assembly is located in a cavity in the garment, and the arrangement allows an electrical connection to be made between an electrical component outside of the garment and the spine assembly within the garment.

Advantageously, the electrical socket 31, coupled to the textile material 3 via the intermediate coupling element 1, together with the electrical plug 41 may provide a low profile connection assembly that is well suited for use with "intelligent" textile materials.

MODIFICATIONS AND FURTHER EMBODIMENTS

The above embodiments are to be understood as illustrative examples of the invention. Alternative embodiments of the invention are envisaged.

Although in the illustrated embodiment, the intermediate coupling element is sewn to the textile material, other ways of attaching the intermediate coupling element to the textile material are possible. For example, the intermediate coupling element may be bonded to the textile material using an adhesive. Alternatively, the intermediate coupling element could be attached to the support element in such a manner that the textile material is gripped between the intermediate coupling element and the support element in a press fit. For example, the intermediate coupling element could be welded to the support element (using chemical welding or ultrasonic welding if polymer or elastomer materials are used, or by electrical resistance, plasma or flame welding if metal materials are used), or mechanically connected using a mechanical latching mechanism such as a ratchet clamp. In a further alternative embodiment the support element is sewn or bonded to the textile material and then the intermediate coupling element is mechanically connected to the support element.

The use of a support element is not required. If greater stiffness is required, alternatively the intermediate coupling element may be made from a more rigid material. To facilitate attaching (e.g. by sewing) such an intermediate coupling element to the textile material, the intermediate coupling element may have a rigid body providing a mechanism for coupling to an electrical socket together with a flexible skirt for connecting to the textile material (e.g. by passing a needle and thread through the flexible skirt). Such an intermediate coupling element may be fabricated, for example, by a dual molding process in which a rigid plastic frame is first molded and then a flexible rubber skirt is over molded. The flexible rubber skirt may have a weakened track formed therein to facilitate sewing and the like.

It will be appreciated that the cross-section of the intermediate coupling element and the support element need not be rectangular. For example, a circular cross-section could be utilized.

It is not necessary to employ a snap-fit connection between the electrical socket and the intermediate coupling element. For example, the intermediate coupling element, in combination with a support element if present, can be suitably rigid to allow a conventional threaded panel nut connection to be used. Other possibilities include the use of circlips or the like (e.g. an "R" clip), or screws passing through clearance holes in the intermediate coupling element.

It will be appreciated that the intermediate coupling element could be used in conjunction with many different types of connection assembly. In other embodiment, an electrical plug could be connected to the intermediate coupling element rather than an electrical socket. Further, the magnetic latching mechanism described in UK patent application no. 1506418.1 is not essential.

In an embodiment, a garment manufacturer produces garments with a plurality of intermediate coupling elements attached, either directly or indirectly, thereto. Blank connectors are removably coupled to the intermediate coupling elements to close the apertures through the intermediate coupling elements. Such an arrangements permits various different configurations of electrical connections to be used by removing the blank connectors from selected intermediate coupling elements to permit electrical connection, while retaining the blank connectors in the unselected intermediate coupling elements. It will be appreciated that such an arrangement also permits the configuration to be changed by coupling electrical connectors to a different selection of intermediate coupling elements while providing blank connectors in the remaining intermediate coupling elements.

Typically, a blank connector will be a piece of material that fits into an intermediate coupling element and closes the aperture through the intermediate coupling element, but has no electrical function.

Although the above embodiments are concerned with mounting an electrical connector to a panel of textile material, the invention could also be applied to mounting an electrical connector to different types of flexible planar material.

What is claimed is:

1. An apparatus for mounting an electrical connector to a flexible planar material, the apparatus comprising an intermediate coupling element comprising:

a frame portion defining an aperture;

a flange portion extending around at least part of the aperture to overlap the flexible planar material to facilitate attachment to the flexible planar material; and a coupling mechanism for coupling the electrical connector to the intermediate coupling element when the intermediate coupling element is attached to the flexible planar material to permit electrical connection through the flexible planar material, wherein the flange portion comprises a plurality of holes to allow passage of a needle and thread in a sewing operation.

2. The apparatus of claim 1, wherein the intermediate coupling element comprises a rigid portion, and wherein the flange portion comprises a flexible skirt portion attached to the rigid portion.

3. The apparatus of claim 1, further comprising the electrical connector, wherein the electrical connector is capable of coupling to the intermediate coupling element by the coupling mechanism.

4. The apparatus of claim 3, wherein the electrical connector is an electrical socket, and wherein the apparatus further comprises an electrical plug.

5. The apparatus of claim 1, wherein the intermediate coupling element has no electrical function.

6. An apparatus for mounting an electrical connector to a flexible planar material, the apparatus comprising an intermediate coupling element comprising:

a frame portion defining an aperture;

a flange portion extending around at least part of the aperture to overlap the flexible planar material to facilitate attachment to the flexible planar material; and a coupling mechanism for coupling the electrical connector to the intermediate coupling element when the intermediate coupling element is attached to the flexible planar material to permit electrical connection through the flexible planar material, wherein:

the intermediate coupling element comprises a flexible material;

the apparatus further comprises a support element having a rigid construction; and wherein the intermediate coupling element is connectable to the support element so that the support element inhibits flexing movement of the intermediate coupling element.

7. The apparatus of claim 6, further comprising the electrical connector, wherein the electrical connector is capable of coupling to the intermediate coupling element by the coupling mechanism.

8. The apparatus of claim 7, wherein the electrical connector is an electrical socket, and wherein the apparatus further comprises an electrical plug.

9. The apparatus of claim 6, wherein the intermediate coupling element has no electrical function.

* * * * *